Nov. 7, 1944.  J. E. FERGUSON ET AL  2,362,433
NOZZLE
Filed Dec. 26, 1942  2 Sheets-Sheet 1
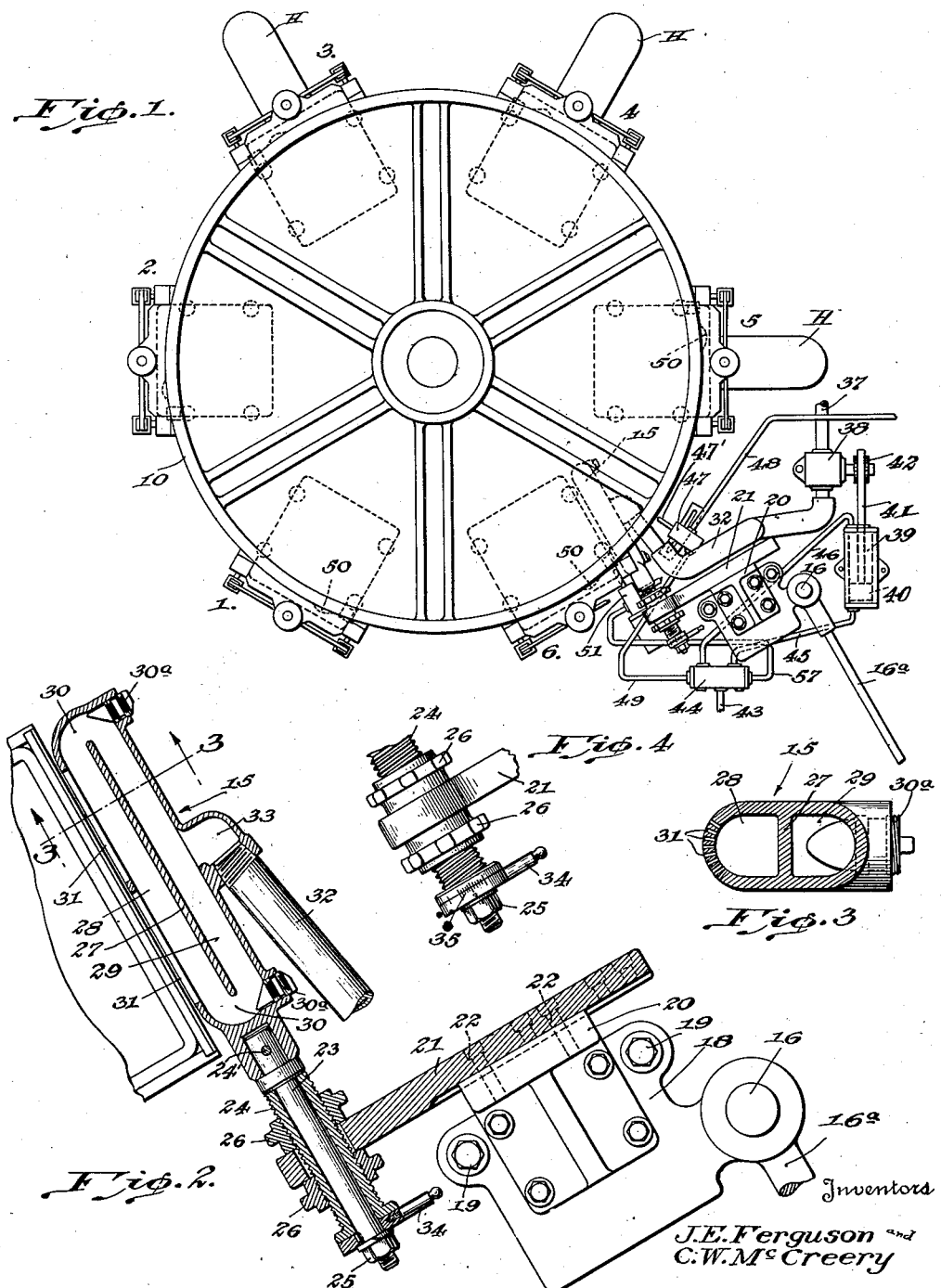
Inventors
J. E. Ferguson and
C. W. McCreery
By Rule & Hoge
Attorney Nov. 7, 1944.   J. E. FERGUSON ET AL   2,362,433
NOZZLE
Filed Dec. 26, 1942   2 Sheets-Sheet 2

Inventors
J. E. Ferguson and
C. W. McCreery
By Rule and Hoge
Attorneys

Patented Nov. 7, 1944

2,362,433

UNITED STATES PATENT OFFICE 2,362,433

NOZZLE

John E. Ferguson and Cecil W. McCreery, Muncie, Ind., assignors to Owens-Illinois Glass Company, a corporation of Ohio Application December 26, 1942, Serial No. 470,154

7 Claims. (Cl. 299—73)

Our invention relates to a novel form of nozzle, particularly adapted for use with and forming a part of an apparatus which may be used for expelling the atmospheric air from the separate sections of a hollow article and substituting dehydrated air or other gas preliminary to sealing said sections together. The invention as herein illustrated and described is particularly adapted for such use in the manufacture of hollow building blocks, but is not limited to this particular use.

An object of the present invention is to provide an improved form of nozzle by which the atmospheric air may be removed substantially completely from the interiors of the hollow sections of an article and simultaneously replaced with gas supplied through the nozzle as the sections are being brought together, preliminary to the sealing operation.

Other objects of the invention will appear hereinafter.

The construction herein illustrated, comprises an apparatus provided with our improved form of nozzle and adapted for bringing together and sealing the complementary sections of hollow glass blocks, and replacing the atmospheric air with dehydrated air or other gas while the said sections are being brought together. Such apparatus is substantially the same as that disclosed in our copending application, Ser. No. 433,354 for Glass block dehydrating mechanism, filed March 4, 1942. The present invention embodies certain modifications and improvements in the blowing nozzle shown in said copending application.

Referring to the accompanying drawings:

Fig. 1 is a plan view of the machine.

Fig. 2 is a sectional plan view of the air nozzle and its supporting means.

Fig. 3 is a section through the nozzle at the line 3—3 on Fig. 2.

Fig. 4 is a fragmentary view showing means for adjusting the nozzle both rotatively and lengthwise.

Figure 5:
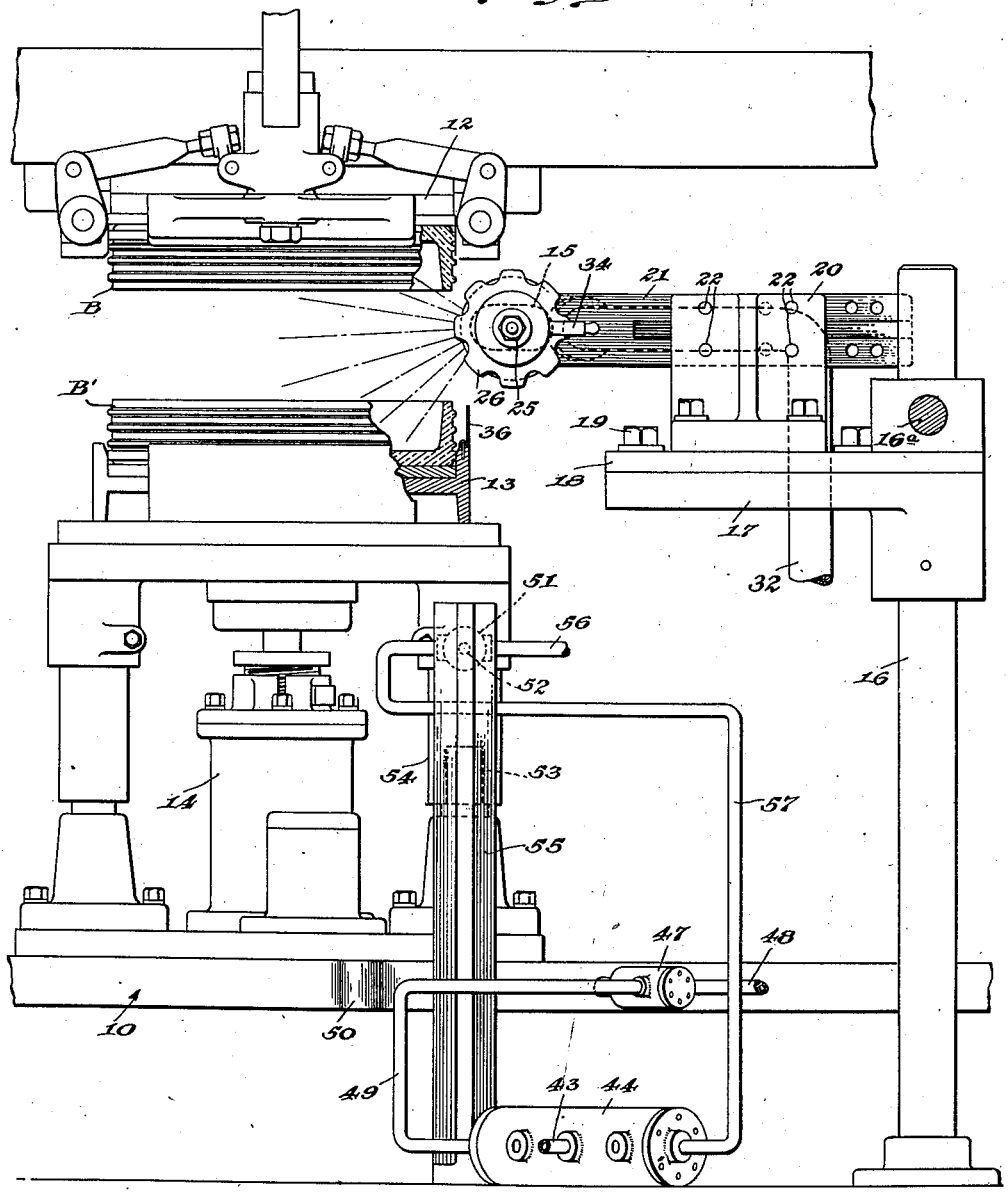
Fig. 5 is a part-sectional elevation of the machine, parts being broken away.

The machine herein shown comprises a carriage 10 on which are mounted sealing units arranged in an annular series and each comprising work holders in which the glass block sections are held while being brought together and sealed. The carriage is rotated intermittently step by step in a conventional manner to bring the units in succession to stations symmetrically arranged around the axis of rotation, including an unloading station 1, a loading station 2 at which the block sections are placed on the machine, heating stations 3, 4, and 5 at which devices H are provided for heating the blocks and softening the edges which are to be sealed together, and a sealing station 6 at which the blocks are brought together and sealed. The blower is also located at station 6. The upper and lower sections B and B' of the blocks are mounted respectively in holders 12 and 13. At station 6 a piston motor 14, which may be air operated, moves the holder 13 upward and brings the block sections into sealing engagement.

The means for introducing dehydrated air or other gas into the hollow block sections prior to the closing and sealing operation comprises an air nozzle 15 having a stationary mounting separate from the mold carriage. This includes a post or column 16 to which is attached an arm 17 carrying a plate 18 secured thereto by bolts 19. A bracket 20 mounted on the plate 18 carries a horizontal arm 21 splined thereon for lengthwise adjustment and secured in adjusted position by screw bolts 22. The nozzle 15 is secured by a pin 24' on a shank 23 in the form of a detachable rod, and a sleeve 24 having its exterior surface screw threaded, is mounted on said shank and secured by a clamping nut 25. The sleeve 24 extends freely through an opening in the arm 21. Clamping nuts 26 threaded on the sleeve 24, clamp the nozzle to the arm 21 after adjustment to any desired position. The post 16 may be pivotally mounted and provided with an arm 16ᵃ for swinging the blower mechanism toward and from the carriage 10.

Referring to Figs. 2 and 3, the nozzle 15, which as shown, may be in the form of a somewhat flattened tube, approximately elliptical in cross section, is closed at both ends and is provided with an integral interior web 27 extending lengthwise thereof and dividing the nozzle into compartments 28 and 29. The web terminates a short distance from each end of the nozzle, thereby forming passageways 30 providing communication between the compartments 28 and 29 while the web serves as a baffle for directing the air which is passing through the nozzle. A fan-shaped series of parallel slots 31 formed in the front face of the nozzle and extending lengthwise thereof, provide discharge outlets. The dehydrated air or gas is supplied to the nozzle through a pipe 32 leading to a port 33 which opens into the compartment 29 at a point intermediate the ends of the nozzle and preferably about midway between the ends, as shown.

At each end of the nozzle a screw threaded plug 30ª is provided in a threaded opening extending through the wall of the nozzle. The inner ends of the plugs project into the passageways 30 and restrict said passageways to an extent which is adjustably variable by adjusting the plugs inwardly or outwardly. These plugs provide a means for adjustably regulating and equalizing distribution of the air flow around the ends of the baffle 27. It has been found in practice that, due to slight irregularities in the cored-out interior passages of the nozzle, the air flow around the ends of the baffle wall and outwardly through the slots 31, is seldom or never the same for any two castings. By means of the throttling plugs or screws 30ª, adjustments of the air flow are readily made to give the desired uniformity of distribution.

The construction of the nozzle as just described, provides for an even distribution of the air or gas and a substantially uniform discharge at all points along the nozzle, the gas being radiated from the nozzle and fanned outwardly to enter the hollow block sections as indicated by broken lines in Fig. 5. In this manner the atmospheric air in said sections is effectively blown out and replaced by the dehydrated air or other gas from the nozzle while the latter is positioned between the sections of the block. It will be noted that the upper holder 12 with the block section B moves in a plane above that of the nozzle while the path of the lower holder and block section B' is below the nozzle. Thus during each indexing operation the block sections which are approaching the sealing station 6, traverse the nozzle, passing respectively above and below the nozzle. When the carriage is arrested at the sealing station, the nozzle is closely adjacent to and extends along the side of the block sections. The blowing of the dehydrated air preferably is commenced, in the manner hereinafter described, as the blower is brought into a position between the separated block sections and is continued until the carriage has been arrested and the section B' moved upward to or adjacent to the sealing position.

A nozzle of the construction disclosed overcomes difficulties experienced with the use of a nozzle having its outlet at one end thereof, and provides for a more satisfactory and effective displacement of the atmospheric air and substitution of the dehydrated air or other gas. The nozzle 15 is rotatably adjustable about its longitudinal axis by means of a handle 34, the position of adjustment being indicated by a scale 35 (Fig. 4). A shield 36 (Fig. 5) is carried on the holder 13 in position to be interposed between the nozzle and the block section B' as the latter moves upward and thereby prevents the direct impingement of the air against the exterior surface of the glass. Undue cooling is thus prevented.

The mechanism for controlling the supply of dehydrated air to the nozzle 15 will now be described. Referring to Fig. 1, the air is supplied from any suitable source through a pipe 37 to a control valve 38 from which the pipe 32 extends to the nozzle. The valve 38 is actuated by an air operated piston motor comprising a cylinder 39. The piston rod 41 is extended and formed with rack teeth to engage a pinion 42 on the stem of the valve 38. Air under pressure for operating the piston motor is supplied through an air pressure pipe 43 to a spool valve 44. Pressure pipes 45 and 46 lead from the valve 44 to the lower and upper ends respectively of the motor cylinder 39.

When air under pressure is supplied through the pipe 46 to the motor cylinder, the piston is lowered and the valve 38 opened for supplying the dehydrated air or gas to the nozzle.

Movement of the valve 44 into position thus to supply air through pipe 46 is under the control of a poppet valve 47 which controls the supply of air under pressure from a pipe 48 to a pipe 49 leading to the valve 44. The poppet valve 47 is normally opened momentarily during each indexing movement of the carriage by means of a cam lobe 50 or other actuating device on the carriage, there being a cam lobe for each head, positioned and timed to contact the valve stem 47' and thus actuate the valve shortly before the indexing movement is completed. The dehydrated air is thus discharged through the nozzle while the latter is directly between the block sections.

The valve 44 is reversed to cut off the supply of air to the nozzle, preferably just before the lower block section B' has reached its sealing position, such reversal being under the control of a poppet valve 51. This valve includes a valve stem 52 (Fig. 5) in the path of a boss 53 which serves as a cam for opening the valve. This cam is mounted on a lifting frame 54 which carries the mold block holder 13. The valve 51 has a stationary mounting on a standard 55. When the valve 51 is opened by its cam, air pressure from a supply pipe 56 leading to the valve is transmitted from the valve through a pipe 57 to the right-hand end of the spool valve 44, thereby reversing it and causing a reversal of the motor piston 40, whereby the valve 38 is closed.

Modifications may be resorted to within the spirit and scope of our invention.

We claim:

1. A nozzle in the form of a tube closed at both ends, a web within the nozzle extending lengthwise thereof and terminating short of said ends and thereby dividing the nozzle into compartments, passages connecting the ends of said compartments, said nozzle having an inlet port intermediate its ends opening into one said compartment, and formed with outlet openings extending lengthwise of the nozzle in the wall of the other compartment, said web forming a baffle by which gas is directed to the ends of the nozzle and distributed to said outlets, and a throttling device in the passageway at one end of the nozzle, said throttling device being adjustable for adjusting the distribution of the flow to opposite ends of the nozzle.

2. A nozzle in the form of a tube closed at both ends, a web within the nozzle extending lengthwise thereof and terminating short of said ends and thereby dividing the nozzle into compartments, passages connecting the ends of said compartments, said nozzle having an inlet port intermediate its ends opening into one said compartment, and formed with outlet openings extending lengthwise of the nozzle in the wall of the other compartment, said web forming a baffle by which gas is directed to the ends of the nozzle and distributed to said outlets, and throttling plugs adjustably mounted in the ends of the nozzle and adjustable to regulate the distribution of the flow.

3. Apparatus comprising a nozzle for displacing atmospheric air and substituting another gas in the hollow sections of a glass block which are to be sealed together, said nozzle being in the form of a straight tube of uniform size and shape in cross section substantially throughout its length, and having a rounded, convex front surface, said tube being closed at both ends and formed with outlet openings through said surface and extending lengthwise thereof, said openings being positioned side by side in a group extending transversely of said convex surface, whereby gas discharged from said openings is fanned outwardly in divergent directions, said nozzle having an inlet port intermediate its ends, and a pressure pipe opening into the nozzle through said port through which gas under pressure is transmitted to the nozzle.

4. Apparatus comprising a nozzle for displacing atmospheric air and substituting another gas in the hollow sections of a glass block which are to be sealed together, said nozzle being in the form of a straight tube of uniform size and shape in cross section substantially throughout its length, and having a rounded, convex front surface, said tube being closed at both ends and formed with outlet openings through said surface and extending lengthwise thereof, said openings being positioned side by side in a group extending transversely of said convex surface, whereby gas discharged from said openings is fanned outwardly in divergent directions, said nozzle having an inlet port intermediate its ends, a pressure pipe opening into the nozzle through said port through which gas under pressure is transmitted to the nozzle, and a baffle plate within the nozzle between said port and the outlets and arranged to direct the gases from said port to the ends of the nozzle and thence to said outlets, said baffle plate being extended lengthwise of the nozzle beyond the outlet openings.

5. A nozzle in the form of a tube of uniform size and shape in cross section substantially throughout its length and closed at both ends, a web within the nozzle extending lengthwise thereof and terminating near said ends and dividing the nozzle into separate compartments in communication only at the end portions of the nozzle, said nozzle having an inlet port intermediate its ends opening into one said compartment and provided with outlet openings in the outer wall of the other compartment, the wall portion having said outlet openings being convex in cross section and said outlet openings being arranged and positioned at intervals transversely of the nozzle, whereby gas discharged from said openings is fanned outwardly, said web being in a position to form a baffle by which gas supplied through said inlet port is directed to the ends of the nozzle and distributed to said outlets.

6. A nozzle in the form of a tube of uniform size and shape in cross section substantially throughout its length and closed at both ends, a web within the nozzle extending lengthwise thereof and terminating near said ends and dividing the nozzle into separate compartments in communication only at the end portions of the nozzle, said nozzle having an inlet port intermediate its ends opening into one said compartment, the outer wall of the other said compartment having a convex surface formed with elongated slits extending lengthwise of the nozzle and providing discharge openings through said convex surface, said slits being positioned side by side in group form and with the group of outlets extending transversely of said convex surface, whereby gas discharged from the nozzle through said outlets is fanned outwardly.

7. A nozzle in the form of a tube of uniform size and shape in cross section substantially throughout its length and closed at both ends, a web within the nozzle extending lengthwise thereof and terminating near said ends and dividing the nozzle into separate compartments in communication only at the end portions of the nozzle, said nozzle having an inlet port intermediate its ends opening into one said compartment, the outer wall of the other said compartment having a convex surface formed with elongated slits extending lengthwise of the nozzle and providing discharge openings through said convex surface, said slits being positioned side by side in group form and with the group of outlets extending transversely of said convex surface, whereby gas discharged from the nozzle through said outlets is fanned outwardly, said web being extended lengthwise of the nozzle to points beyond the outlet openings, and adjustable means for adjustably varying and equalizing the distribution of gas supplied through said inlet port to the ends of the nozzle.

JOHN E. FERGUSON.
CECIL W. McCREERY.